US007206935B2

(12) United States Patent
Scott

(10) Patent No.: US 7,206,935 B2
(45) Date of Patent: Apr. 17, 2007

(54) SYSTEM AND METHOD FOR PROTECTING NETWORK APPLIANCES AGAINST SECURITY BREACHES

(75) Inventor: Robert Paxton Scott, Sunnyvale, CA (US)

(73) Assignee: Nokia Inc., Irving, TX (US)

( * ) Notice: Subject to any disclaimer, the term of this patent is extended or adjusted under 35 U.S.C. 154(b) by 810 days.

(21) Appl. No.: 10/123,878

(22) Filed: Apr. 15, 2002

(65) Prior Publication Data

US 2002/0188724 A1    Dec. 12, 2002

Related U.S. Application Data

(60) Provisional application No. 60/283,587, filed on Apr. 13, 2001.

(51) Int. Cl.
*H04L 9/00* (2006.01)
(52) U.S. Cl. ............... 713/170; 713/169; 713/181; 726/3
(58) Field of Classification Search .......... 713/170
See application file for complete search history.

(56) References Cited

U.S. PATENT DOCUMENTS

| 5,655,077 | A | * | 8/1997 | Jones et al. ............. 726/8 |
| 5,812,668 | A | * | 9/1998 | Weber .................. 705/79 |
| 5,931,917 | A | * | 8/1999 | Nguyen et al. ......... 709/250 |
| 5,978,484 | A | | 11/1999 | Apperson et al. |
| 6,061,794 | A | | 5/2000 | Angelo et al. |
| 6,161,181 | A | | 12/2000 | Haynes, III et al. |
| 6,523,027 | B1 | * | 2/2003 | Underwood ............ 707/4 |

OTHER PUBLICATIONS

PCT/US02/12042: Notification Of Transmittal of the International Search Report or the Declaration; Sep. 12, 2002.

* cited by examiner

*Primary Examiner*—Kambiz Zand

(57) ABSTRACT

The present invention is directed to a system and method for protecting a network appliance against a security breach. The network appliance is protected by an appliance protector component that resides within the network appliance. The appliance protector protects the network appliance by monitoring processes for a valid signature and terminating processes with an invalid signature.

22 Claims, 11 Drawing Sheets

SYSTEM AND METHOD FOR PROTECTING NETWORK APPLIANCES AGAINST SECURITY BREACHES

RELATED APPLICATION

This application claims the benefit of U.S. Provisional Application No. 60/283,587 filed Apr. 13, 2001, the benefit of the filing date of which is hereby claimed under 35 U.S.C. §119(e).

FIELD OF THE INVENTION

This invention relates generally to providing security to a network, and more particularly to protecting network appliances against security breaches.

BACKGROUND OF THE INVENTION

In recent years, there has been a dramatic upsurge in the popularity of electronic communication in business and home applications. The number of networks and the volume of data continue to increase at a rapid rate. To cope with the ever-increasing demand for faster, more secure and more far-reaching networks, a variety of network appliances are being used to meet these demands.

As useful as they are, however, network appliances are vulnerable to hijacking or corruption. A security breach could inhibit or disrupt the intended function of a network appliance. Even worse, a security breach may disrupt an entire network in which the network appliance is installed. Network appliances do not have a readily available user interface for a system administrator to interact with it. As a result, it is difficult for a system administrator to ascertain whether a network appliance has been compromised.

Even when an interface with the network appliance is established, the active participation of a system administrator is required to adequately protect the network appliance from being invaded by unauthorized processes. Manual intervention on the part of the administrator knowledgeable in the detailed operation of the network appliance is often required to detect and repair security breaches and misappropriation of resources. It is with respect to these considerations and others that the present invention has been made.

SUMMARY OF THE INVENTION

The present invention is directed at addressing the above-mentioned shortcomings, disadvantages and problems, and will be understood by reading and studying the following specification.

According to one aspect of the invention, a method for protecting a network appliance against a security breach on a network appliance is provided. A process executing on the network appliance is monitored for a valid signature. The current signature of the process is determined and is compared with an expected signature. If the signature is not valid, the process is terminated.

In accordance with another aspect of the invention, an encrypted response is sent to the process when the signature is valid.

In accordance with yet another aspect of the invention, the current signature is determined by sending an initiation signal and receiving the current signature from the process through a communication channel.

In accordance with still another aspect of the invention, a process associated with a process list is started and monitored for a valid signature.

In accordance with a still further aspect of the invention, a method of communicating between two processes associated with a network appliance is provided. The first process sends an initiation signal. In response to the initiation signal, the second process sends a signature to the first process.

In accordance with another aspect of the invention, a network appliance containing a computer medium encoded with components is provided. The components may be employed to implement the method described above.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "coupled"

means either a direct connection between the items connected, or an indirect connection through one or more passive or active intermediary devices. The term "network device" means a device that is coupled to a network. The term "network appliance" means a computing device that is coupled to a network and is designed to perform at least one function relating to the network. The term "process" means one or more tasks that may be performed by a computing device. The term "appliance protector" refers to a process that protects a network appliance against a security breach. The term "AP process" means a process that executes on a network appliance and is monitored by an appliance protector. AP process includes AP-aware process as well as AP-unaware process. AP-aware processes are processes executing on a network appliance that may directly communicate with an appliance protector. AP-unaware processes are AP processes executing on a network appliance that are not able to directly communicate with an appliance protector.

Briefly, the present invention is directed to a system and method for protecting a network appliance against a security breach. The network appliance is protected by an appliance protector component that may reside within the network appliance. The appliance protector protects the network appliance by monitoring processes for a valid signature and terminating processes with an invalid signature. The appliance protector also starts, updates, and restarts processes that execute on the network appliance.

Illustrative Operating Environment

Figure 1:
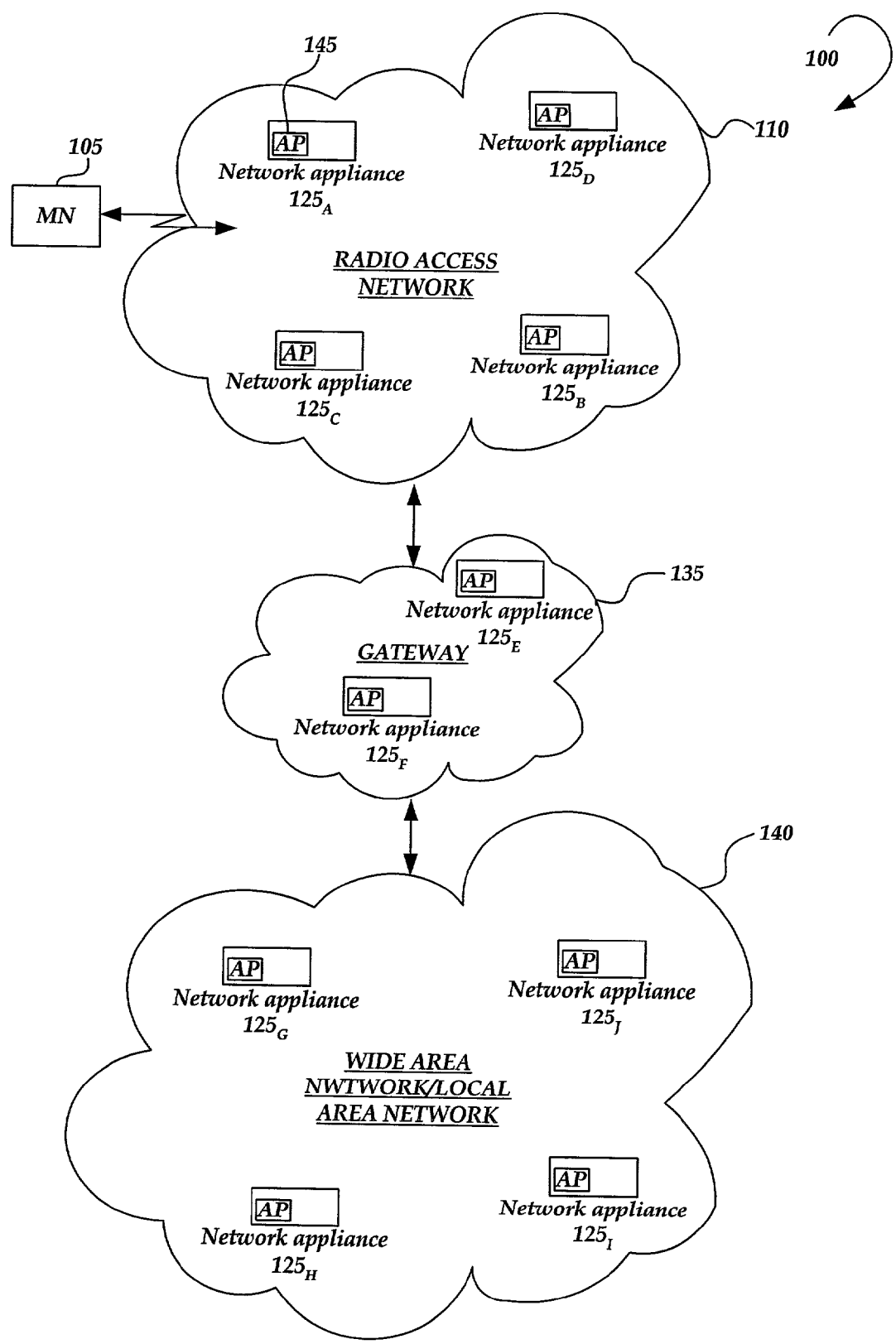
FIG. 1 shows an exemplary network system in which the invention may operate.

With reference to FIG. 1, an exemplary network system in which the invention may operate is illustrated. As shown in the figure, exemplary network system 100 includes mobile node (MN) 105, radio access network (RAN) 110, gateway 135, network appliance $125_{A-J}$ and wide area network (WAN)/local area network (LAN) 140.

MN 105 is coupled to RAN 110. Generally, MN 105 may include any device capable of connecting to a wireless network such as RAN 110. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like.

RAN 110 transports information to and from devices capable of wireless communication, such as MN 105. RAN 110 may include both wireless and wired components. For example, RAN 110 may include a cellular tower that is linked to a wired telephone network. Typically, the cellular tower carries communication to and from cell phones, pagers, and other wireless devices, and the wired telephone network carries communication to regular phones, long-distance communication links, and the like. RAN 110 may include network devices, such as network appliances $125_{A-D}$, as shown in the figure.

Network appliances $125_{A-D}$ may include computer devices such as routers, switches, hardware firewalls, content filters, file servers, network traffic load balancers, hubs, and the like. Because network appliances $125_{A-D}$ are coupled to a network, they are vulnerable to security breaches, such as invasion by unauthorized processes. As a security measure, an appliance protector 145 may be executing in network appliances $125_{A-D}$ to protect the appliances against security breaches. Appliance protector 145 will be discussed in more detail in conjunction with FIG. 3. Briefly stated, appliance protector 145 ensures that a network appliance does not operate when a security breach is detected.

RAN 110 is coupled to WAN/LAN 140 through gateway 135. Gateway 135 routes information between RAN 110 and WAN/LAN 140. For example, a mobile node, such as MN 105, may request access to the Internet by calling a certain number or tuning to a particular frequency. Upon receipt of the request, RAN 110 is configured to pass information between MN 105 and gateway 135. Gateway 135 may translate requests from MN 105 to a specific protocol, such as hypertext transfer protocol (HTTP) messages, and then send the messages to WAN/LAN 140. Gateway 135 translates responses to such messages into a form compatible with the requesting mobile node. Gateway 135 may also transform other messages sent from MN 105 into information suitable for WAN/LAN 140, such as e-mail, audio, voice communication, contact databases, calendars, appointments, and the like. As shown in the figure, gateway 135 may include network devices, such as network appliances $125_{E-F}$ that may contain an appliance protector.

WAN/LAN 140 is an IP packet based backbone network that transmits information between computing devices. One example of WAN is the Internet. An example of a LAN is a network used to connect computers in an office or a home. A WAN may connect multiple LANs. As shown in the figure, WAN/LAN 140 may include network devices, such as network appliances $125_{G-J}$ that may also contain an appliance protector.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links.

Network system 100 may include many more components than those shown in FIG. 1. However, the components shown are sufficient to disclose an illustrative embodiment for practicing the present invention.

The media used to transmit information in the communication links as described above illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
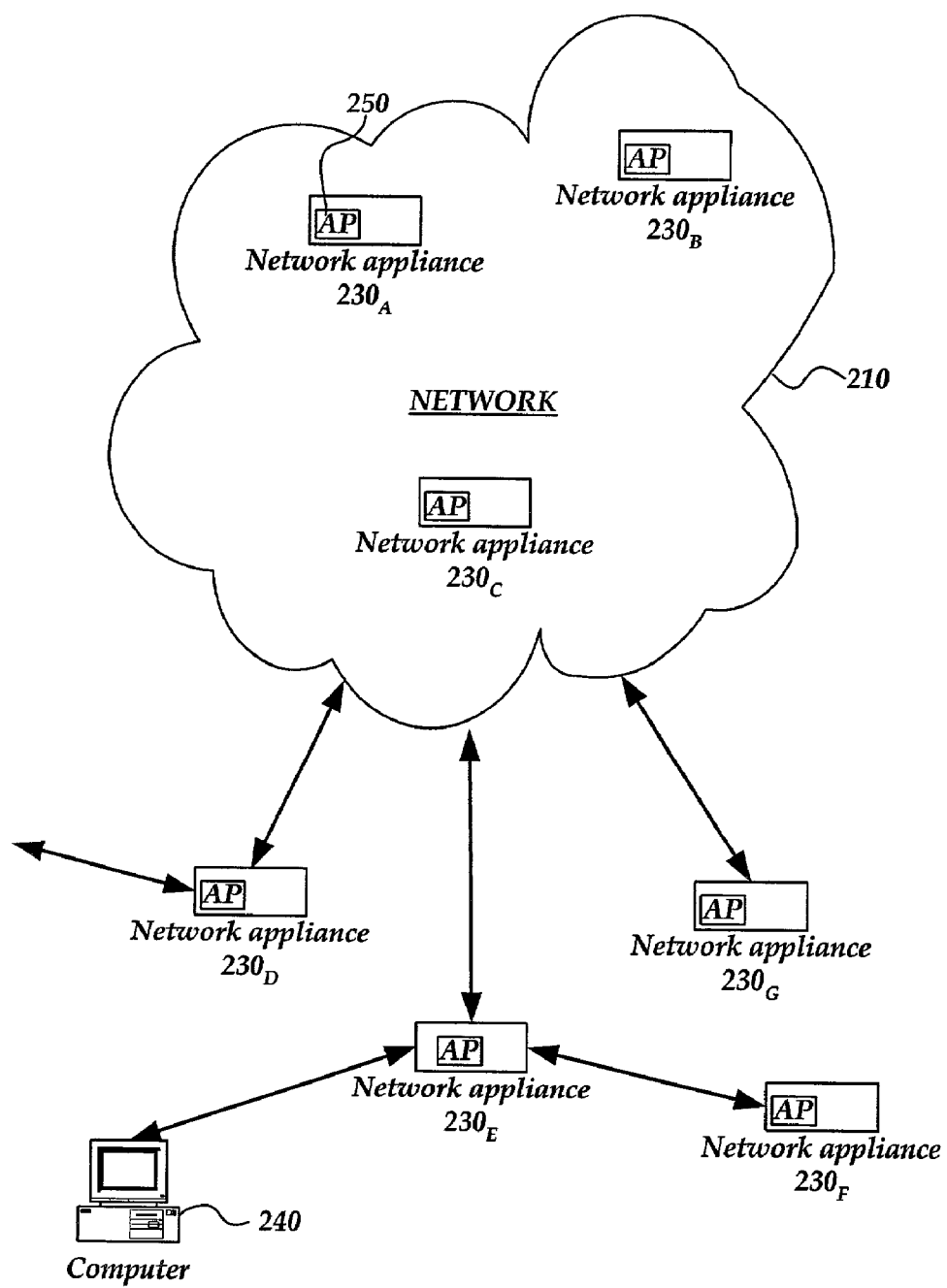
FIG. 2 illustrates a schematic diagram of the various locations at which a network appliance may be coupled to a network.

FIG. 2 shows a schematic diagram of exemplary locations at which a network appliance may be coupled to a network. Illustrated are network appliances $230_{A-G}$ that are installed at various points relative to exemplary network 210. To prevent security breaches, network appliances $230_{A-G}$ may be protected by appliance protector 250.

As shown in the figure, network appliances, such as network appliances $230_{A-C}$, may be part of the infrastructure of network 210. According to one embodiment, network appliances $230_{A-C}$ may be routers. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

Network appliance $230_D$ is coupled to network 210 and links network 210 to other networks (not shown). Network appliance $230_D$ may be a router, a gateway, switch, or other device that links networks.

Network appliance $230_E$ connects network 210 with computer 240 and network appliance $230_F$. Network appliance $230_E$ may be a hub, a router, a network traffic load balancer or similar device. Network appliance $230_E$ may also have hardware and software components that allow network appliance $230_E$ to service network 210, such as serving as a filter, a firewall, etc. Computer 240 may be any network device that allows direct access by a user, such as a personal computer, workstations, TV, phone, etc. Network appliances $230_{F-G}$ may be any network appliance at the end point of a network connection, such as a network printer, file server, etc.

Figure 3:
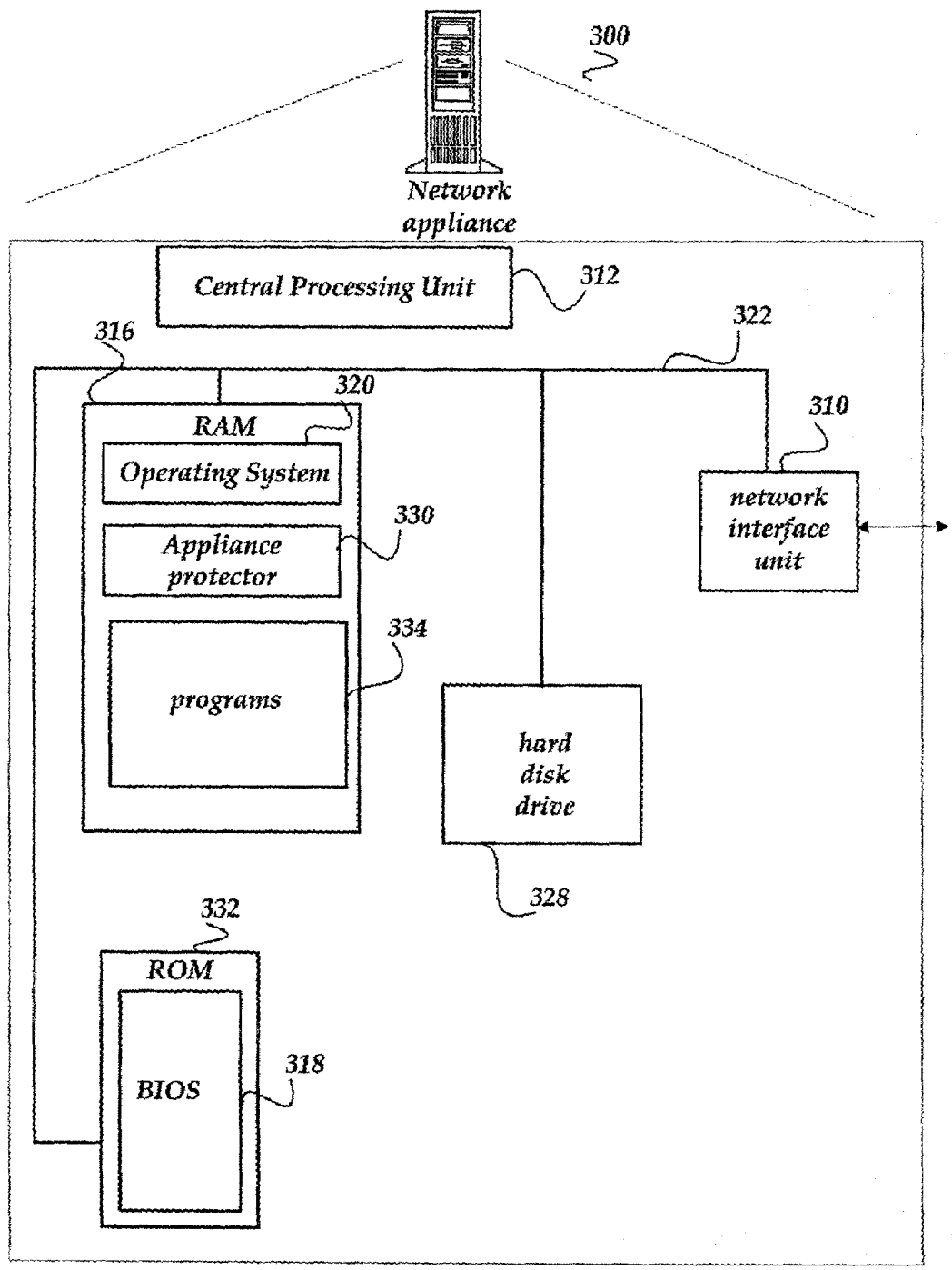
FIG. 3 illustrates a schematic diagram that shows an exemplary network appliance.

FIG. 3 illustrates a schematic diagram that shows an exemplary network appliance. Network appliance 300 may include many more components than those shown in FIG. 3. However, the components shown are sufficient to disclose an illustrative embodiment for practicing the present invention.

As shown in FIG. 3, network appliance 300 may be coupled to RAN 105 or WAN/LAN 140, or other communications network, via network interface unit 310. Network interface unit 310 includes the necessary circuitry and protocols for connecting network appliance 300 to RAN 105 or WAN/LAN 140. Typically, there is one network interface unit 310 provided for each network connecting to network appliance 300.

Network appliance 300 also includes processing unit 312, and a mass memory, all connected via bus 322. The mass memory generally includes RAM 316, ROM 332, and optionally, one or more permanent mass storage devices, such as hard disk drive 328, a tape drive, CD-ROM/DVD-ROM drive, and/or a floppy disk drive. The mass memory stores operating system 320 for controlling the operation of network appliance 300. This component may comprise a general purpose operating system 320 as is known to those of ordinary skill in the art, such as UNIX, LINUX™, Microsoft WINDOWS NT®, and the like. Alternatively, the operating system may be specialized to support the specific functions of network appliance 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for appliance protector 330, and other programs 334 such as programs that enable network appliance 300 to perform its functions. Appliance protector program 330 protects network appliance 300 from security breaches by starting, monitoring, restarting, terminating, and updating processes that execute on network appliance 300.

Appliance Protector

Figure 4:
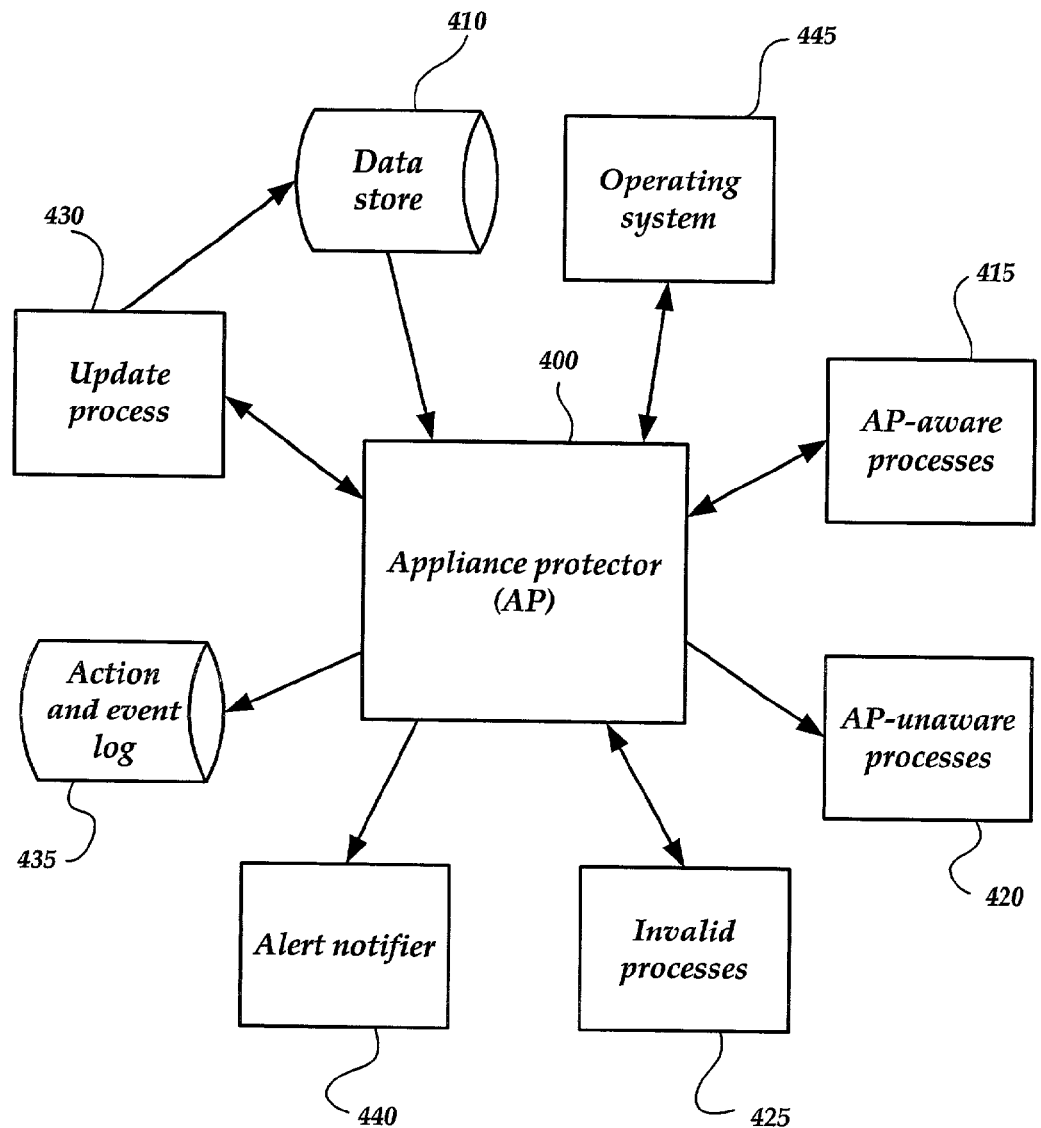
FIG. 4 illustrates a block diagram of components of a network appliance that implement this invention.

FIG. 4 shows exemplary components of a network appliance. As illustrated, the figure shows an appliance protector (AP) 400 that interacts with data store 410, AP-aware processes 415, AP-unaware processes 420, invalid processes 425, update process 430, action and event log 435, alert notifier 440, and operating system 445.

AP 400 is a component of a network appliance, such as network appliance 300. AP 400 provides protection against security breaches by monitoring all AP processes on a network appliance for a valid signature. AP processes include AP-aware processes 415 as well as AP-unaware processes 420. According to one embodiment of the invention, AP 400 starts all AP processes on the network appliance. In addition, AP 400 monitors for updates on its functionality as well as for updates on AP processes.

AP 400 executes at a higher priority than the other processes on a network appliance. The higher execution priority enables AP 400 to start, restart, monitor and, if necessary, terminate AP processes.

Data store 410 contains information used by AP 400. The information in data store 410 may be recorded by AP 400, update process 430, operating system 445, and other components of a network appliance. The information stored in data store 410 will be discussed in detail in conjunction with FIG. 5. Briefly stated, the information in data store 410 includes rules for starting and interacting with AP processes that execute on a network appliance.

AP-aware processes 415 do not execute on a network appliance without an appliance protector also executing. Even if an appliance protector is executing, the survival of an AP-aware process in a network appliance depends on whether the AP-aware process has properly interacted with the appliance protector and whether it has the proper signature.

Like AP-aware processes 415, AP-unaware processes 420 are monitored by AP 400. Briefly stated, AP 400 monitors AP-unaware processes 420 to ensure that they are authorized and are properly executing (See FIG. 6B).

Invalid processes 425 are processes that are unauthorized. An invalid process may be an AP-aware process, an AP-unaware process, or some other unauthorized process. When AP 400 determines that an invalid process is executing on a network appliance, AP 400 terminates the invalid process.

Update process 430 is a process that is used to update AP 400 or any AP process executing on a network appliance. According one embodiment of the invention, update process 430 has a higher execution priority than AP 400. Thus, when update process 430 is executing, AP 400 acts as instructed by update process 430. The procedure for updating AP 400 and AP processes will be discussed in detail in conjunction with FIG. 11. Briefly stated, update process 430 instructs AP 400 to terminate processes that require an update, update the affected AP processes, and restart the AP processes when the update is completed.

Action and event log 435 is a data store that contains a record of events and actions taken by AP 400. The events and actions stored may include status information relating to starting and restarting of AP processes, and information relating to the failing of AP processes, the termination of invalid processes, the updating of processes, and the like.

Alert notifier 440 sends alert notifications when a predetermined event has occurred. According to one embodiment, the notifications are sent to a system administrator. AP 400 may instruct alert notifier 440 to send an alert notification to a system administrator when a predetermined action or event has occurred.

Operating system 445 oversees operations of the network appliance. Operating system 445 may provide access to AP 400 for obtaining information about AP processes. Operating system 445 may provide process status information relating to AP processes through a process monitor.

Figure 5:
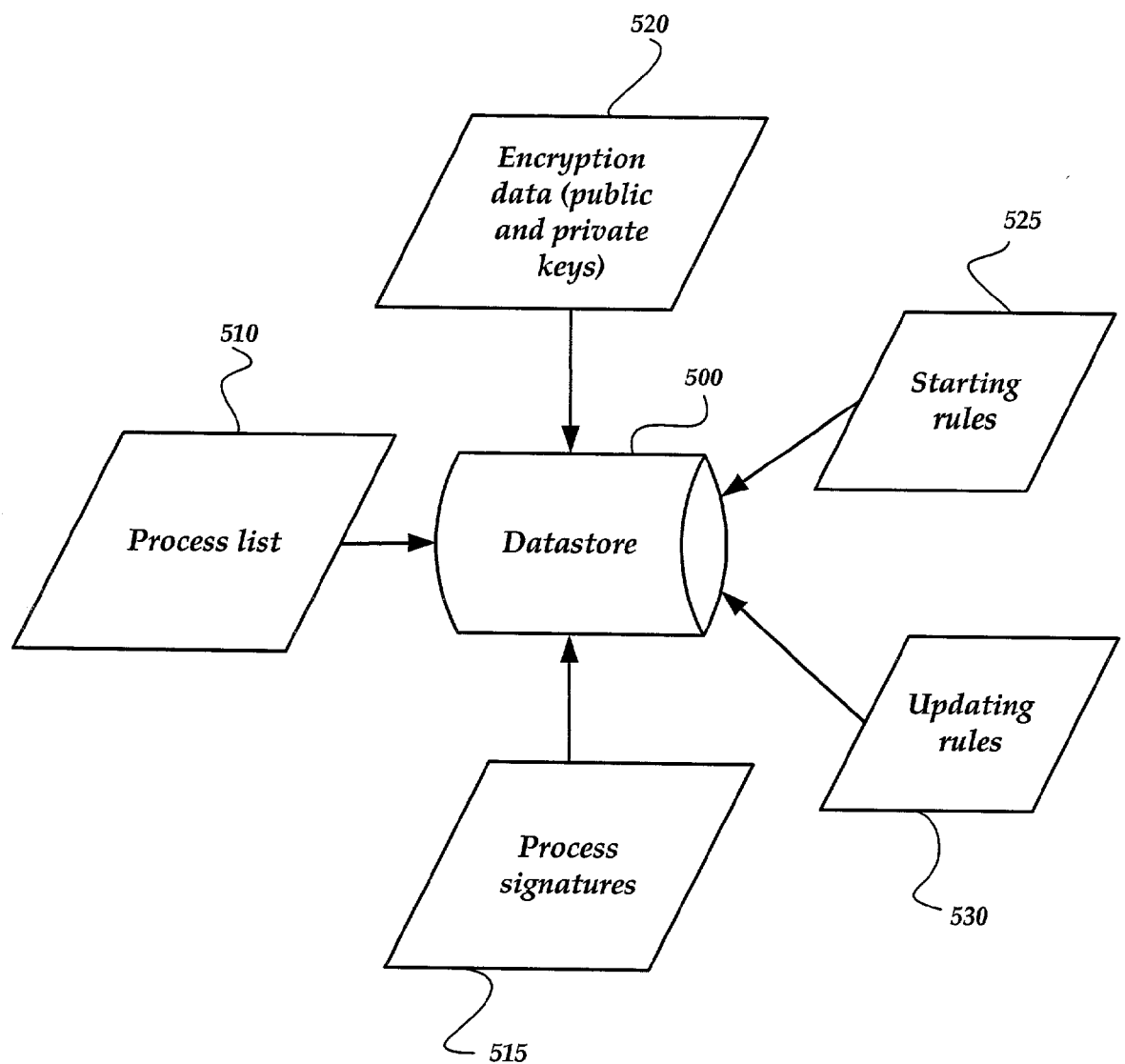
FIG. 5 illustrates a schematic diagram of an exemplary data store for an appliance protector.

FIG. 5 illustrates a schematic diagram of an exemplary data store for an appliance protector, such as data store 410 shown in FIG. 4. Data store 500 stores information that may be used by an appliance protector. As illustrated, data store 500 includes process list 510, process signatures 515, encryption data 520, starting rules 525 and updating rules 530.

Process list 510 includes AP processes that are authorized to be executing on a network appliance. AP processes listed in process list 510 are started by an appliance protector. Process list 510 may be updated by an update process, such as update process 430, as shown in FIG. 4.

Process signatures 515 are identification data associated with AP processes. The identification data in process signatures 515 may include process identification, version information, status information, and other information related to each AP process. Status information of an AP process may include parameters related to the execution of the process, such as memory usage, run time, etc. Process signatures 515 are used to determine whether an AP process is authorized to execute on a network appliance.

Starting rules 525 are rules that instruct an appliance protector to start AP processes. The starting of AP processes will be discussed in detail in conjunction with FIG. 8. Briefly stated, an appliance protector uses starting rules 525 to start all AP processes that are included in process list 510.

Updating rules 530 are rules that instruct an appliance protector to interact with an update process. Updating rules 530 may instruct the appliance protector to terminate itself or any one of the AP processes for updating.

Encryption data 520 enables an appliance protector to securely communicate with AP-aware processes. Encryption data 520 may include data used for encrypting information, such as public and private keys.

Figure 6A:
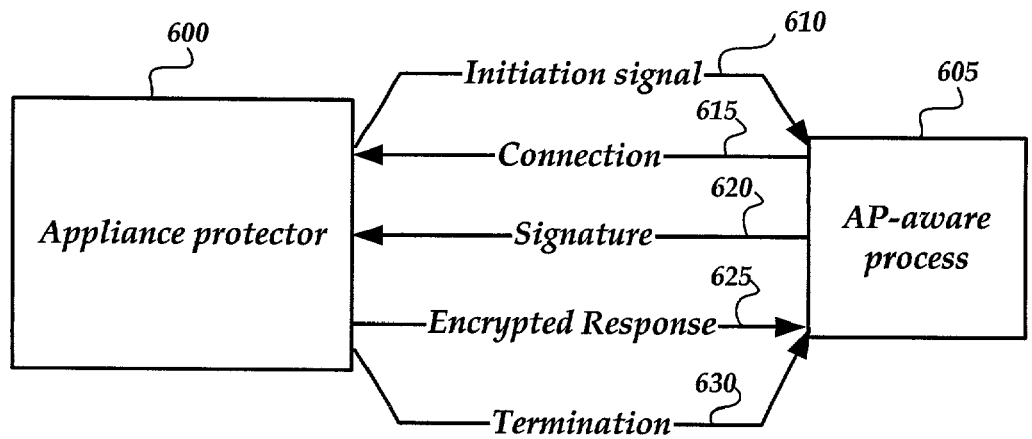
FIG. 6A illustrates a schematic diagram of communications between an appliance protector and an AP-aware process.

FIG. 6A illustrates a schematic diagram of communications between an appliance protector and an AP-aware process. Appliance protector 600 and AP-aware process 605 interact with each other through communications that include initiation signal 610, connection 615, signature 620, encrypted response 625, and termination command 630. Appliance protector 600 monitors AP-aware process 605 for valid signature. The appliance protector may respond to AP-aware process 605 if the signature is valid or terminate AP-aware process 605 if the signature is invalid.

Initiation signal 610 initiates communication between appliance protector 600 and AP-aware process 605. Initiation signal 610 may be broadcasted to all processes executing on a network appliance. AP-aware processes may recognize and respond to initiation signal 610.

Connection 615 is a communication channel initiated by AP-aware process 605 for connecting to appliance protector 600. Connection 615 may employ any type of communication protocols, such as Transmission Control Protocol (TCP)/Internet Protocol (IP).

Signature 620 is data related to AP-aware process 605 that is sent to appliance protector 600 by AP-aware process 605. Signature 620 may include process identification, version information, status information, and other relevant data. Appliance protector 600 uses signature 620 to determine whether AP-aware process 605 is authorized to execute on the network appliance.

Encrypted response 625 is encrypted data sent to AP-aware process 605 by appliance protector 600 after signature 620 has been determined to be valid. Encrypted response is encrypted with encryption data 520. Encrypted response 625 is received and decrypted by AP-aware process 605.

Termination command 630 is a command that may be sent by appliance protector 600 to terminate AP-aware process 605. Appliance protector may send termination command 630 to AP-aware process 605 if signature 620 has been determined to be invalid. Termination command 630 terminates AP-aware process 605.

Figure 6B:
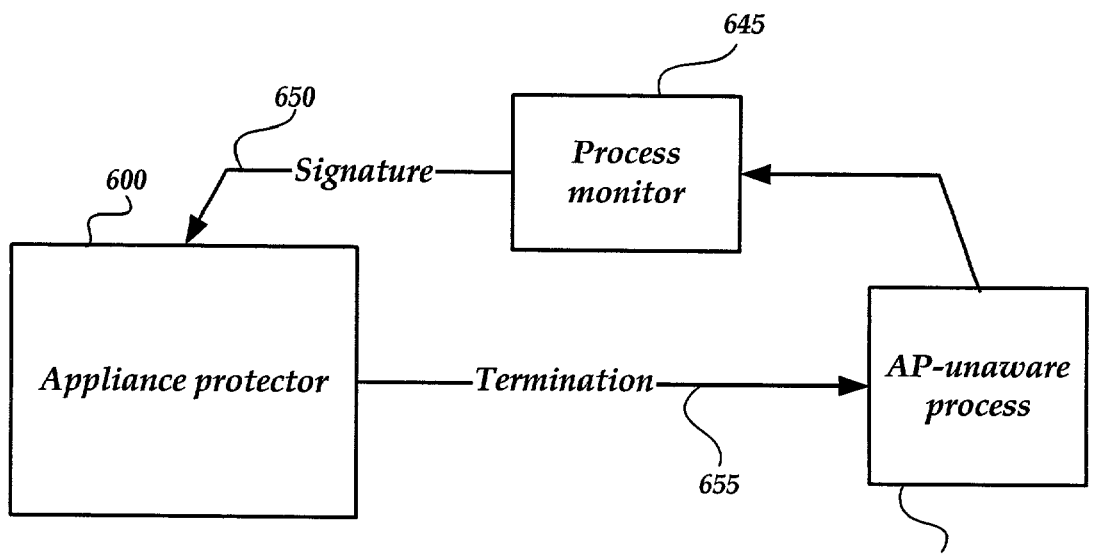
FIG. 6B illustrates a schematic diagram of communications between an appliance protector and an AP-unaware process.

FIG. 6B illustrates a schematic diagram of communications between an appliance protector and an AP-unaware process. Appliance protector 600 monitors AP-unaware process 640 by obtaining signature 650 from process monitor 645. Appliance protector 600 may terminate AP-unaware process 640 if signature 650 has been determined to be invalid.

Process monitor 645 is a component of a network appliance that obtains information associated with processes executing on the network appliance. Process monitor 645 may be a part of the network appliance's operating system, such as operating system 445, or an independent process. As shown in the figure, process monitor 645 obtains signature 650 of AP-unaware process 640. Signature 650 may include process identification, version information, memory usage, run time, etc. Appliance protector 600 may obtain signature 650 from process monitor 645.

Termination command 655 may be sent by appliance protector 600 to terminate AP-unaware process 640. Appliance protector 600 may send termination command 650 to AP-unaware process 640 if signature 650 has been determined to be invalid.

Figure 7:
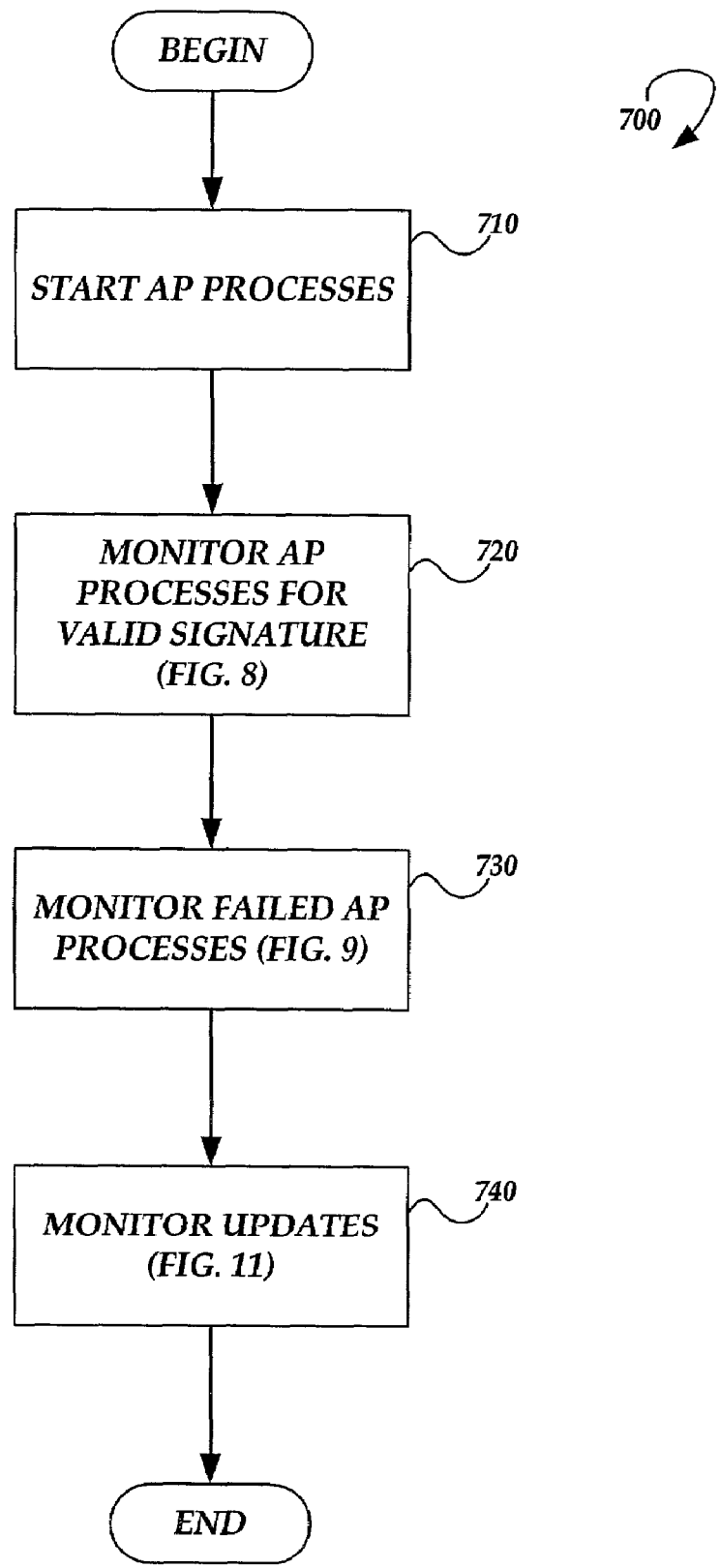
FIG. 7 illustrates a general overview of a process that may be implemented by an appliance protector to protect a network appliance.

FIG. 7 illustrates a general overview of a process that may be implemented by an appliance protector to protect a network appliance, according to one embodiment of the invention. Process 700 begins at a start block and flows to block 710 where AP processes are started by the appliance protector. According to one embodiment of the invention, the appliance protector is started automatically by the operating system of a network appliance. The appliance protector starts the AP processes when it has begun executing. According to one embodiment, the appliance protector determines which AP processes to start by referring to a process list.

Moving to block 720, the AP processes are monitored by the appliance protector for a valid signature. A valid signature is a signature that matches a known signature stored in a data store associated with the appliance protector. Depending on whether the signature is valid, the AP processes being monitored may receive an encrypted response or be terminated (See FIG. 8).

Process 700 then flows to block 730 where the appliance protector monitors for failed AP processes. Briefly stated, the appliance protector may restart a failed AP process, record the event, and send an alert notice (See FIG. 9).

Moving to block 740, the appliance protector monitors for updates on its functionality as well as for updates on AP processes. Briefly stated, the appliance protector interacts with an update process, which performs the update. The appliance protector may terminate processes to facilitate the updating (See FIG. 11).

According to one embodiment of the invention, monitoring of AP processes for valid signature in block 720 and monitoring of failed AP processes in block 730 are repeated at predetermined intervals. Monitoring intervals for one process may be different than those of another process. According to another embodiment of the invention, the intervals for monitoring coincide with the clock speed of the network appliance. According to yet another embodiment of the invention, the interval for monitoring is ten times a second. The process then flows to an end block and returns to processing other actions.

Figure 8:
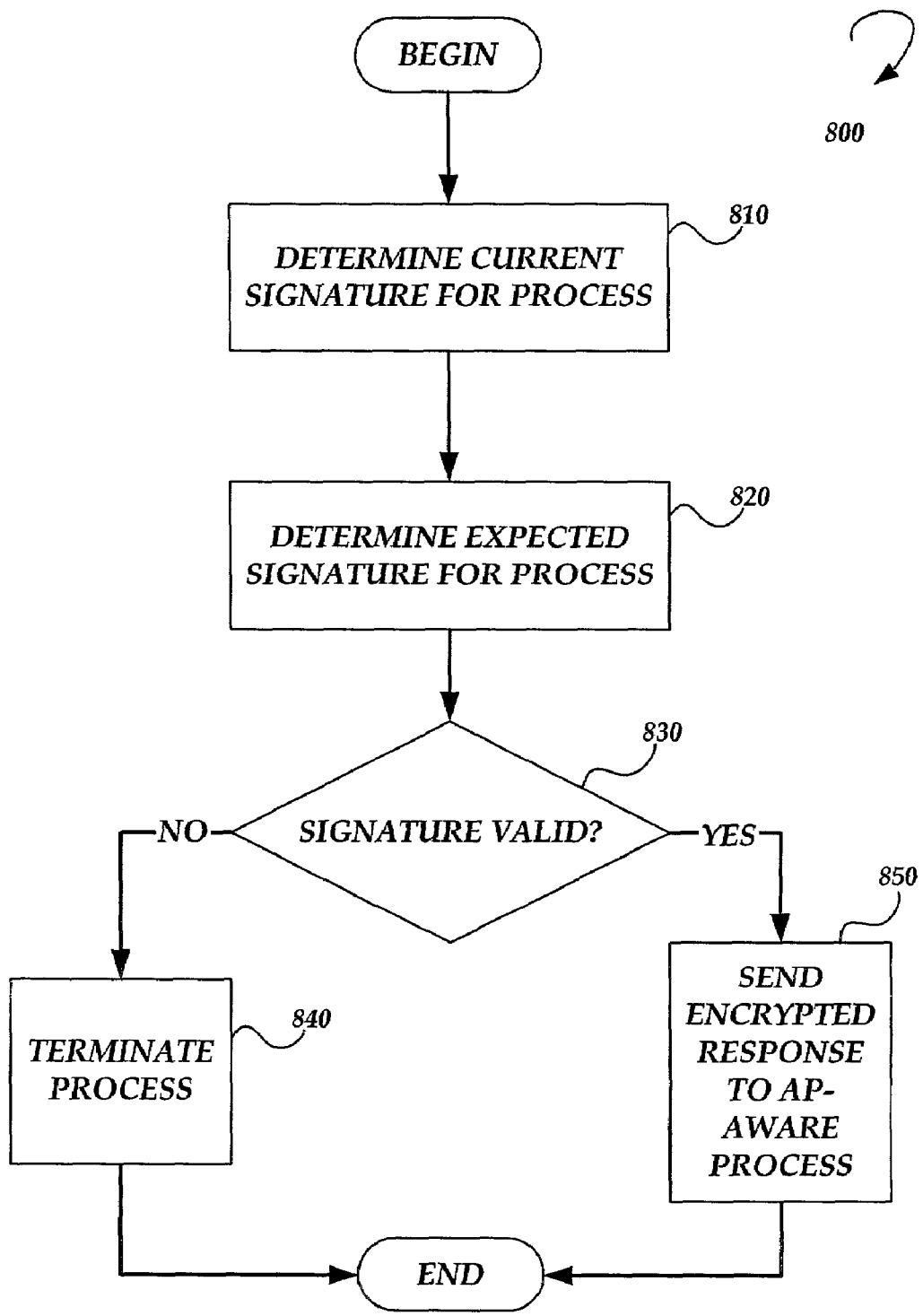
FIG. 8 illustrates a block diagram of a process that may be implemented by an appliance protector to monitor an AP process for a valid signature.

FIG. 8 illustrates a block diagram of a process 800 that may be implemented by an appliance protector to monitor an AP process for a valid signature. After a start block, process 800 flows to block 805, where a determination is made as to whether the AP process being monitored is an AP aware process or an AP unaware process. Transitioning to block 810, the appliance protector determines the current signature of the AP process being monitored. The appliance protector may determine the signature from the AP process if the AP process is an AP-aware process that is capable of presenting its signature. Alternatively, process 800 may determine the signature of the AP process from a process monitor if the AP process is either an AP-unaware process or incapable of sending its signature to the appliance protector.

Next, process 800 moves to block 820 where the appliance protector determines the expected signature for the AP process. The appliance protector may determine the expected signature from a data store associated with the appliance protector. According to one embodiment of the invention, the appliance protector may use the process identification in the current signature to search in the data store for an expected signature with the same process identification. If the data store does not contain any expected signature with a process identification that matches the process identification in the current signature, then there is no expected signature for the AP process.

Process 800 then advances to block 830 where a determination is made as to whether the signature is valid by comparing the current signature and the expected signature. A signature is valid when the contents of the current signature and the contents of the expected signature match. If no expected signature is found, the current signature is invalid.

When the signature of the AP process is valid, process 800 moves to block 850 where an encrypted response is sent to the AP process if the AP process is an AP-aware process. The encrypted response may be created using encryption data. The encrypted response may indicate that the appliance protector validated the signature of the AP process. The encrypted response is received and decrypted by the AP-aware process. The process then flows to an end block.

When the signature of the AP-process is invalid, process 800 moves to block 840 where the appliance protector terminates the AP process. The process then flows to an end block and returns to processing other actions.

Figure 9:
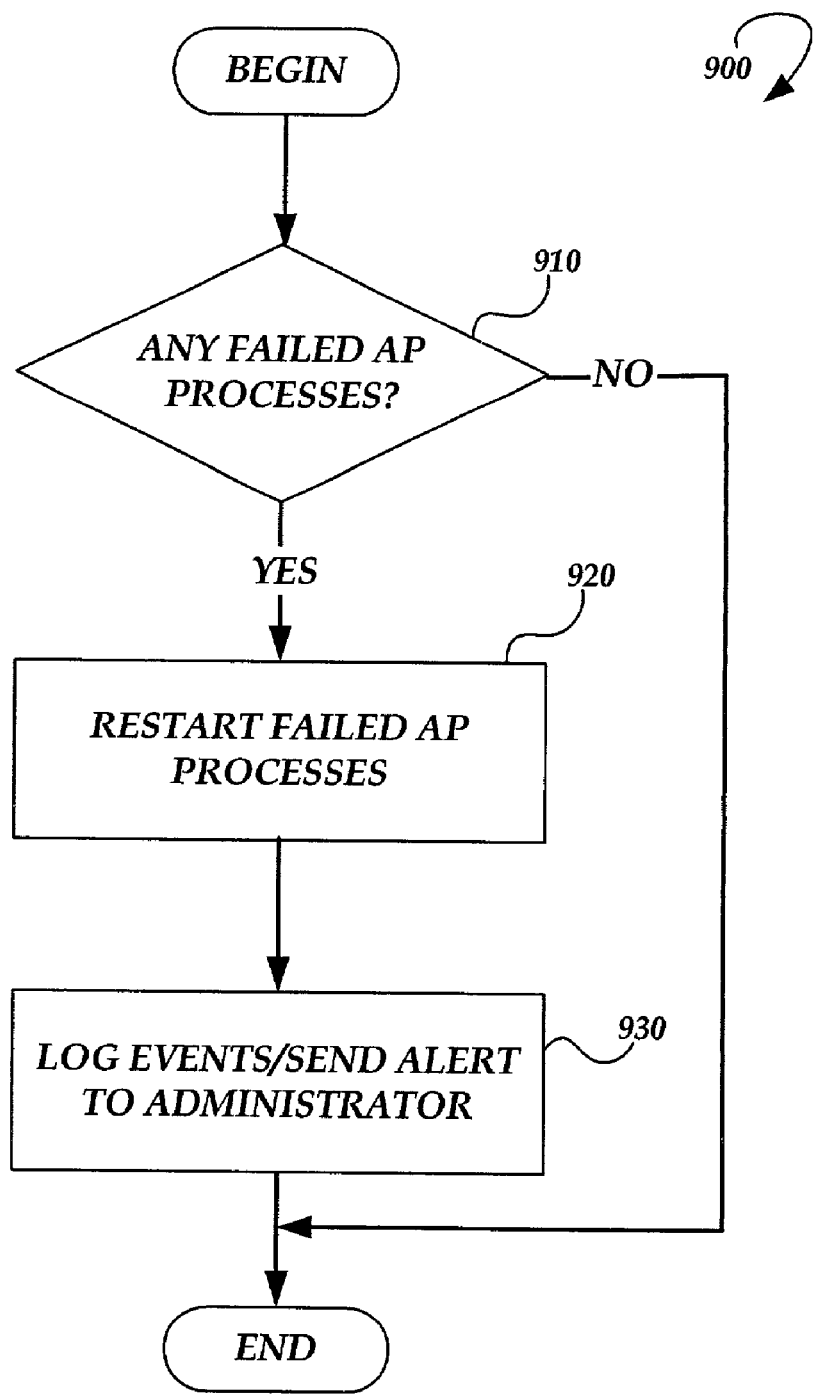
FIG. 9 illustrates a block diagram of a process that may be implemented by an appliance protector to monitor for failed AP processes.

FIG. 9 illustrates a block diagram of a process 900 that may be implemented by an appliance protector to monitor for failed AP processes. At a start block, process 900 moves to block 910 where a determination is made as to whether there are failed AP processes. When there are no failed AP processes, process 900 flows to an end block.

When there are failed AP processes, process 900 moves to block 920 where the appliance protector restarts the failed AP processes. The appliance protector may refer to rules for starting AP processes.

Process 900 then advances to block 930 where the events associated with the restarting may be logged and stored in a data store. Alert notice may also be sent to a system administrator, or some other device. The process then flows to an end block and returns to processing other actions.

Figure 10:
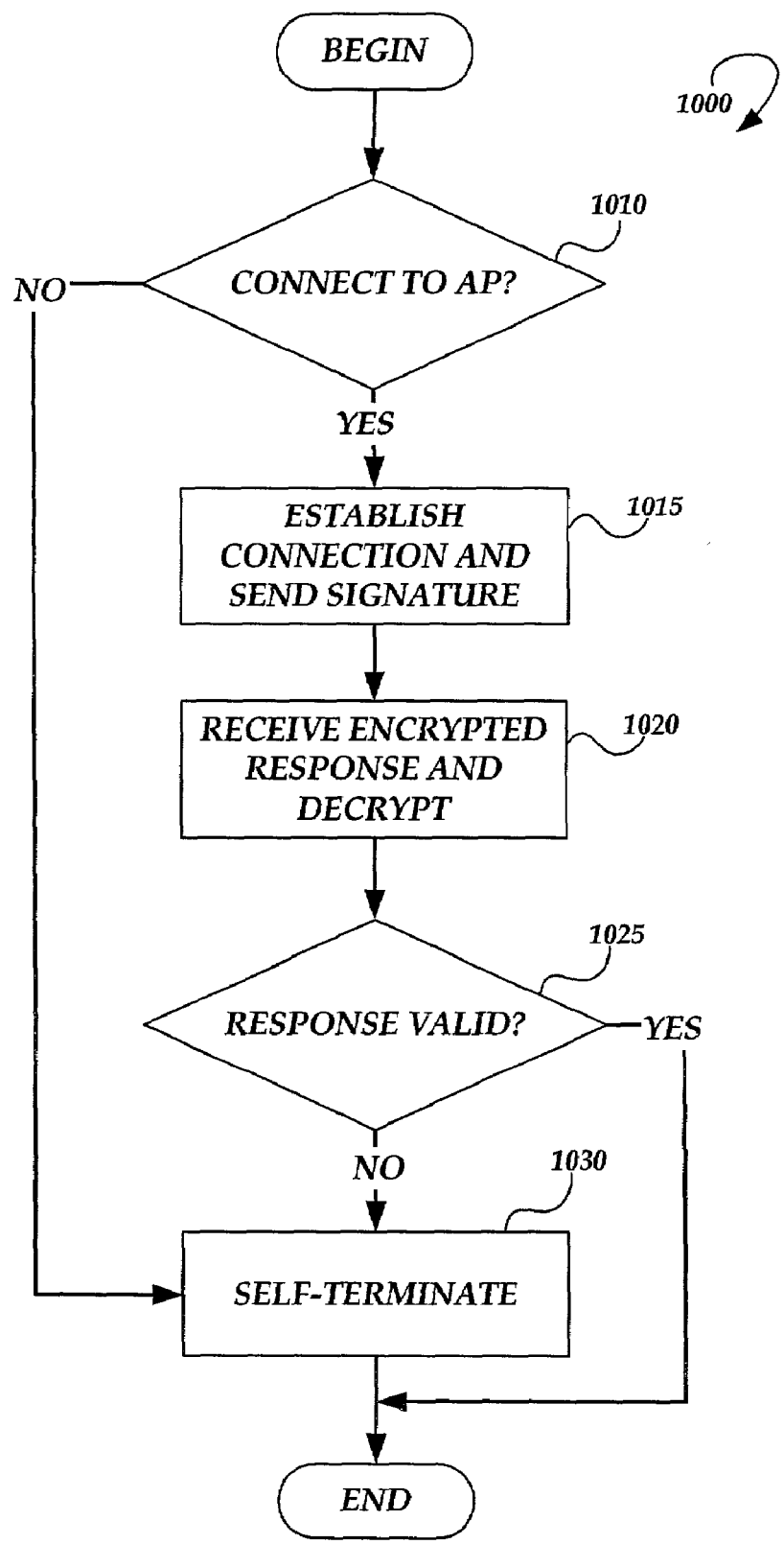
FIG. 10 illustrates a block diagram of a process that may be implemented by an AP-aware process to interact with an appliance protector.

FIG. 10 illustrates a block diagram of a process 1000 that may be implemented by an AP-aware process to interact with an appliance protector. After a start block, process 1000 flows to decision block 1010.

At decision block 1010, a determination is made as to whether a successful connection to the appliance protector can be established when an AP-aware process receives an initiation signal broadcasted by the appliance protector. In one embodiment of the invention, if an AP-aware process does not receive an initiation signal after a predetermined period of time, the AP-aware process will terminate itself (Not shown). When a successful connection may not be established, the process moves to block 1030 where the AP-aware process terminates itself and the process flows to an end block.

When a connection can be established, then process 1000 advances to block 1015 where the AP-aware process establishes a connection with and sends its signature to the appliance protector. When the signature is valid, process 1000 then moves to block 1020 where the AP-aware process receives an encrypted response from the appliance protector and decrypts the response. When the signature is not valid, the AP-aware process will be terminated by the appliance protector (Not shown).

At block 1025, a determination is made as to whether the response from the appliance protector is valid. If so, process 1000 ends. If the response is not valid, then process 1000 moves to block 1030 and the AP-aware process terminates itself. The process then flows to an end block and returns to processing other actions.

Figure 11:
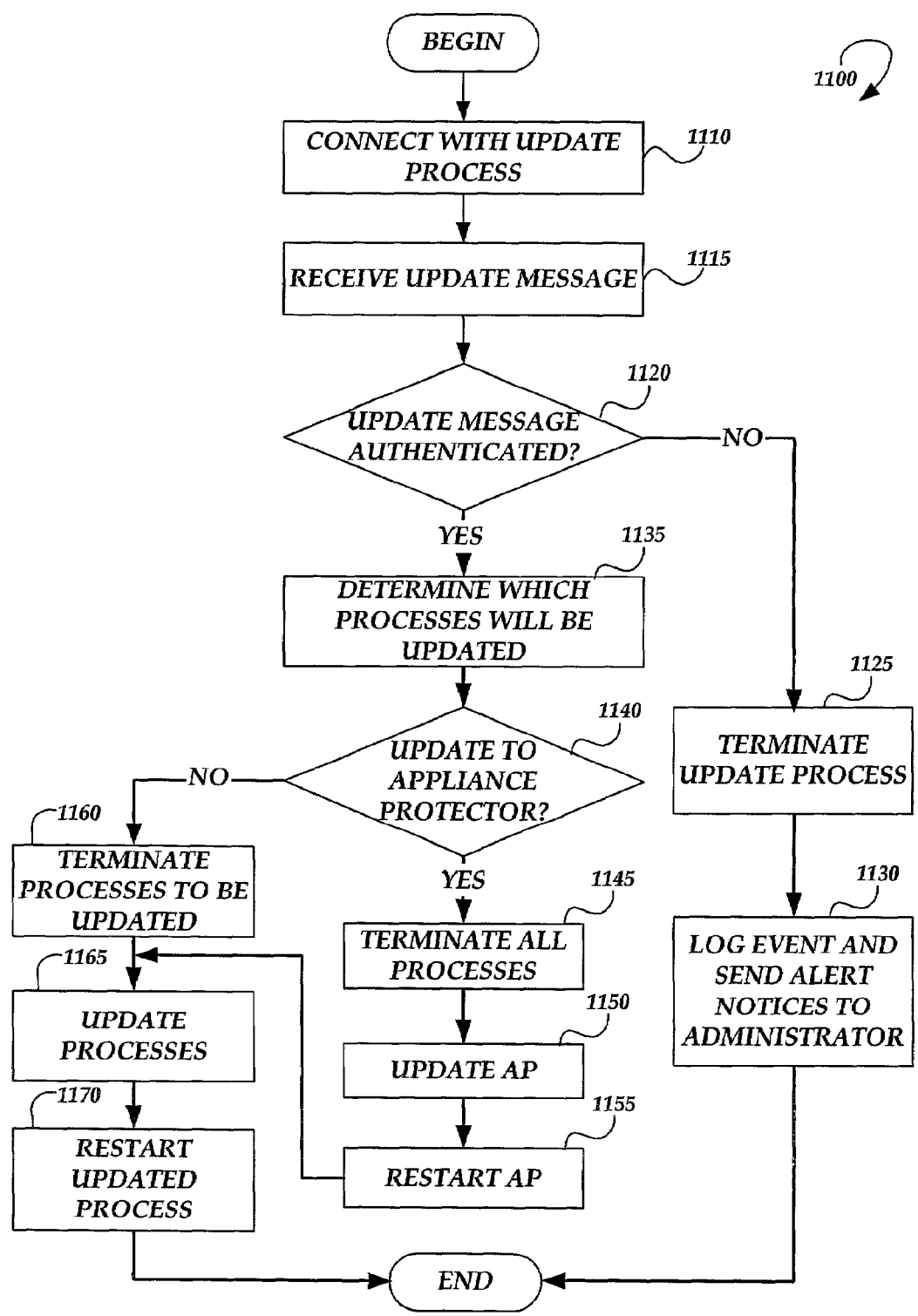
FIG. 11 illustrates a block diagram of a process that may be implemented by an appliance protector to monitor for updates; in accordance with aspects of the invention.

FIG. 11 illustrates a block diagram of a process 1100 that may be implemented by an appliance protector to monitor for updates. After a start block, process 1100 moves to block 1110. At block 1110, the appliance protector establishes a connection with the update process. Process 1100 then moves to block 1115 where a message about the update from the update process is received. The message may contain information on which processes are to be updated.

Next, process 1100 advances to decision block 1120 where a determination is made as to whether the update message is authenticated. When the update message is not authenticated, then process 1100 moves to block 1125 where the appliance protector will terminate the update process if authorized to do so (e.g. having a higher priority). Then, at block 1130, the event is logged and an alert notice is sent. The process then flows to an end block.

When the update message is authenticated, process 1100 moves to block 1135 where the appliance protector determinates which AP processes will be updated. Then, at decision block 1140, a determination is made as to whether the appliance protector is to be updated. If so, then process 1100 advances to block 1145 where the appliance protector terminates all processes that are executing.

At block 1150, the update process updates the appliance protector. The update process may do so by putting updated data in a data store associated with the appliance protector. Process 1100 then moves to block 1155 where the appliance protector restarts. Then, process 1100 continues at block 1165.

Returning to decision block 1140, when the appliance protector is not to be updated, then the appliance protector also moves to 1160. At block 1160, the appliance protector terminates the AP processes that are to be updated. Then, process 1100 also continues at block 1165.

At block 1165, AP processes are updated by the update process. Process 1100 then moves to block 1170 where the AP processes terminated due to the updating are restarted by the appliance protector. The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for protecting a network appliance against a security breach, comprising:
   determining if an AP process is an AP aware process;
   determining if the AP process is an AP unaware process;
   determining a current signature for the AP process executing on the network appliance;
   determining an expected signature for the AP process; comparing the current signature with the expected signature; and
   terminating the AP process when the current signature and expected signature do not match;
   wherein the comparing occurs at predetermined intervals and the predetermined intervals relate to a clock speed of the network appliance.

2. The method in claim 1, further comprising, sending an encrypted response to the AP aware process when the current signature and expected signature match.

3. The method in claim 1, wherein determining the current signature further comprises: sending an initiation signal; and receiving the current signature from the AP process through a communication channel.

4. The method in claim 3, wherein the communication channel uses a TCP/IP protocol.

5. The method in claim 1, wherein determining the current signature further comprises; receiving the current signature from a process monitor if the AP process has been determined to be an AP unaware process.

6. The method in claim 1, wherein the current signature and the expected signature comprises identification data associated with the AP process.

7. The method of claim 6, wherein the identification data is selected from process identification, version information, memory usage, and run time data, associated with the AP process.

8. The method in claim 1, further comprising determining if the process fails, and if the process fails, restarting the process.

9. The method of claim 1, further comprising receiving an update message; and when the update message has been received: terminating the AP process; updating the AP process; and restarting the AP process.

10. A method for protecting a process on a network appliance against a security breach, comprising:
    starting the process on the network appliance when the process is listed in a process list;
    determining a current signature of the process;
    determining an expected signature for the process;
    determining if the signature is valid by comparing the current signature with the expected signature;
    if the signature is not valid, terminating the process, otherwise, sending an encrypted response to the process; and
    receiving an update message, and in response to receiving the update message updating the process, wherein updating the process further comprises: terminating the process; updating the process; and restarting the updated process when the update is complete.

11. The method of claim 10, further comprising determining if the process fails, and if the process fails restarting the process.

12. The method of claim 10, wherein the determining if the signature is valid by comparing, occurs at predetermined intervals and the predetermined intervals relate to a clock speed of the network appliance.

13. A network appliance, comprising:
    a processor and a computer-readable medium;
    an operating environment executing on the processor from the computer-readable medium;
    a network interface unit arranged to communicate with a network;
    a data store including an expected signature for a process; and
    an appliance protector program executing under the control of the operating system and operative to perform actions, including: determining a current signature of the process, determining the expected signature of the process, determining when the signature is valid by comparing the current signature with the expected signature at predetermined intervals that relate to a clock speed of the network appliance, and, when the signature is determined to not be valid, terminating the process.

14. The network appliance of claim 13, wherein the data store further comprises a process list; and wherein the appliance protector program starts processes listed within the process list.

15. The network appliance of claim 13, wherein the data store further comprises encryption data; and when the appliance protector program determines when the signature is valid, the appliance protector sends a response that is encrypted using the encryption data.

16. The network appliance of claim 13, further comprising an update process; wherein the update process updates the process.

17. The network appliance of claim 13, wherein the appliance protector program is operative to perform actions including: receiving an update message, and in response to receiving the update message updating the process, wherein updating the process further comprises: terminating the process; updating the process; and restarting the updated process when the update is complete.

18. A network appliance, comprising:
    processing means for executing an operating environment;
    interface means for communicating with a network;
    storing means for storing an expected signature for a process; and
    appliance protection means for determining a current signature of the process, determining the expected signature of the process, determining if the signature is valid by comparing the current signature with the expected signature at predetermined intervals that relate to a clock speed of the network appliance, and, if the signature is determined to not be valid, terminating the process.

19. The network appliance of claim 18, wherein the appliance protection means is arranged to perform: receiving an update message, and in response to receiving the update message updating the process, wherein updating the process further comprises: terminating the process; updating the process; and restarting the updated process when the update is complete.

20. A machine-readable medium comprising instructions for causing a computer to:
- start a process on a network appliance if the process is listed in a process list;
- determine a current signature of the process;
- determine an expected signature for the process;
- determine if the signature is valid by comparing the current signature with the expected signature at predetermined intervals that relate to a clock speed of the network appliance; and
- if the signature is not valid, terminate the process, otherwise, send an encrypted response to the process.

21. the machine-readable medium of claim 20, comprising instructions for causing a computer to perform: receiving an update message, and in response to receiving the update message updating the process, wherein updating the process further comprises: terminating the process; updating the process; and restarting the updated process when the update is complete.

22. A method for protecting a network appliance against a security breach, comprising:
- determining if an AP process is an AP aware process; determining if the AP process is an AP unaware process;
- determining a current signature for the AP process executing on the network appliance;
- determining an expected signature for the AP process; comparing the current signature with the expected signature;
- terminating the AP process when the current signature and expected signature do not match; and
- receiving an update message; and when the update message has been received: terminating the AP process; updating the AP process; and restarting the AP process.

* * * * *